United States Patent [19]

Gentry, Jr. et al.

[11] Patent Number: 5,563,275

[45] Date of Patent: Oct. 8, 1996

[54] ANIONIC POLYMERIZATION PROCESSES

[75] Inventors: Frederick P. Gentry, Jr., Bear; Owen W. Webster, Wilmington, both of Del.

[73] Assignee: E. I. Du Pont de Nemours and Company, Wilmington, Del.

[21] Appl. No.: 399,788

[22] Filed: Mar. 7, 1995

[51] Int. Cl.$^6$ ............... C08F 4/16; C08F 4/46; C08F 4/58; C08F 220/10; C08F 297/02; C08F 265/06

[52] U.S. Cl. ............ 526/194; 526/328; 526/173; 526/180; 526/181; 525/271; 525/309

[58] Field of Search ............... 526/194, 328, 526/173, 180, 181; 525/271, 309

[56] References Cited

U.S. PATENT DOCUMENTS 4,547,476   10/1985   Terano et al. ............... 502/127

OTHER PUBLICATIONS

Haggard, R. A. et al, *Progress in Organic Coatings*, 12, 1–26 (1984).

Andrews, G. D. et al, *New Monomers and Polymers*, 357–380, Plenum Publishing Corp. (1984).

Ozaki, H. et al, *Macromolecules*, 25, 1391–1395 (1992).

Raj, D. J. A. et al, *Macromolecules*, 25, 2774–2776 (1992).

Reetz, M. T. et al, *Agnew. Chem. Int.*, Ed. Engl., 27(10), 1373–1374 (1988).

*Primary Examiner*—Joseph L. Schofer
*Assistant Examiner*—Wu C. Cheng

[57] ABSTRACT

Disclosed herein is a process for anionic polymerization of selected methacrylate monomers at elevated (as high as about 100° C.) temperatures, while maintaining good "living" characteristics, by carrying out the polymerization in the presence of a silicon compound and a large cation. Also disclosed is an improved process for the polymerization of vinyl monomers, including methacrylates, which process comprises the use of an anionic intiator which is a combination of an alkali metal hydride and an alkoxysilane or a combination of an alkali metal alkoxide and a silicon hydride.

18 Claims, No Drawings

ANIONIC POLYMERIZATION PROCESSES

FIELD OF THE INVENTION

The invention concerns improved processes for the anionic polymerization of methacrylates. In particular, the present invention concerns polymerization processes which, in the presence of a large cation and a selected silicon compound, exhibits good "livingness." Also disclosed are novel initiators for anionic polymerization of methacrylates and/or other vinyl monomers.

TECHNICAL BACKGROUND

Anionic polymerization is a well known technique for the polymerization of various monomers, including acrylic-type monomers. Anionic polymerization may be used for making relatively mundane polymers such as molding resins. Anionic polymerization, however, often offers the possibility for excellent control of polymer architecture. Such polymerizations, however, often must be run at very low temperatures, which has limited it commercial application.

The control of polymer architecture allows the preparation of more sophisticated polymers such as block copolymers, which are useful for modifying the surface properties of other polymers. Block polymers, for example, are useful as compatibilizers and as color or pigment dispersants for various inks and coatings.

Anionic polymerization is potentially useful for the control of polymer architecture because, during polymerization under optimal conditions, the growing polymer chain is "living" or, in other words, has a "living end." This means that, under the polymerization conditions, the end of the polymer is a relatively stable group which causes further polymerization. At higher temperatures, however, these living ends have tended to become unstable. Methods for the improvement of anionic polymerization, particularly methods which allow the use of higher temperatures, are, therefore, desired.

General descriptions of anionic polymerization, with respect to methacrylates, can be found in R. A. Haggard, et al., *Progress in Organic Coatings*, vol. 12, p. 1–26 (1984) and G. D. Andrews, et al., *New Monomers and Polymers*, p. 357–380 (Plenum Publishing Corp. 1984).

H. Ozaki, et al., *Macromolecules*, vol. 25, p. 1391–1395 (1992) describe the polymerization of methacrylate esters which contain alkoxysilane groups at −78° C.

D. J. A. Raj, et al., *Macromolecules*, vol. 25, p. 2774–2776 (1992) and M. T. Reetz, et al., *Angew. Chem. Int.*, Ed. Engl., vol. 27, p. 1373–1374 (1988) describe the anionic polymerization of various methacrylates in the presence of large cations. These polymerizations, however, are not believed to be living and are, therefore, not able, or not expected, to produce useful block copolymers.

SUMMARY OF THE INVENTION

This invention concerns two processes for anionic polymerization, both of which involve the use of a silicon compound. The first process involves the anionic polymerization of a methacrylic monomer of the formula $CH_2=C(CH_3)CO_2R^1$, wherein the improvement comprises, carrying out said anionic polymerization at a temperature of about −20° C. to about +100° C. in the presence of an effective amount of at least one silicon compound of the formula $(R^2O)_nSiR^3_{4-n}$ and, furthermore, in the presence of an effective amount of at least one large cation which serves as an anion counterion during the anionic polymerization, wherein $R^1$ is hydrocarbyl or substituted hydrocarbyl;

each $R^2$ is independently hydrocarbyl, substituted hydrocarbyl, or, in combination with a second $R^2$, o-phenylene;

each $R^3$ is independently hydrocarbyl, substituted hydrocarbyl, or siloxy; and n is 1, 2, 3 or 4; provided that the $pK_a$ of the conjugate acid of $R^2O-$ is about 12 to about 20.

This invention also concerns a second process for the anionic polymerization of vinyl monomers, including methacrylates, at a temperature of about −20° C. to about +100° C., wherein the improvement comprises using, as an anionic initiator, a combination of (1) an alkali metal hydride, (2) a complexing for an alkali metal cation, and (3) a silicon compound of the formula $(R^2O)_nSiR^3_{4-n}$, wherein said alkali metal is selected from the group consisting of sodium, potassium, and cesium. Alternatively, said improvement may comprise using, as an anionic initiator, a combination of (1) a sodium, potassium or cesium alkoxide, and (2) a silicon hydride. In the latter formula for the silicon compound, each $R^2$ is independently hydrocarbyl, substituted hydrocarbyl, or, in combination with a second $R^2$, o-phenylene;

each $R^3$ is independently hydrocarbyl, substituted hydrocarbyl, or siloxy; and n is 1, 2, 3 or 4.

DETAILS OF THE INVENTION

As indicated above, the present invention is directed to improved processes for anionic polymeriziation. For the purposes of the present description, the term "hydrocarbyl" means a univalent radical containing only carbon and hydrogen. By the term "o-phenylene" is meant the divalent radical $-C_6H_4-$ in which the open valencies are ortho to each other. By "substituted hydrocarbyl" herein is meant a univalent radical containing carbon and hydrogen, which radical may be substituted with one or more functional groups that do not interfere with the anionic polymerization (but which may deliberately participate, or assist, in the polymerization, as mentioned below). Such functional groups, however, should not contain active hydrogens (i.e., relatively acidic hydrogen atoms), such as, for instance, hydroxyl, carboxyl, primary amino, etc. Suitable substitutents include ether, tertiary amino, sulfide, ester, nitrile, tetraalkylammonium, silyl, and oxysilyl. Preferred hydrocarbyl and substituted hydrocarbyl groups contain 1 to about 50 carbon atoms, more preferably about 1 to 20 about carbon atoms, and most preferably 1 to about 10 carbon atoms, although, in some instances, such groups may be polymeric, containing large numbers of carbon atoms. By siloxy is meant $-OSi\equiv$, wherein the open bonds are to one or more of $-OR^2$, $R^3$ or additional siloxy. These silicon compounds also may be polymeric (e.g., polysiloxanes).

In the first polymerization process, as mentioned above, a large cation is present as a counterion. Such cation may function as a counterion, or gegenion, to the anion which is the polymerization initiator. While the exact chemical nature of the gegenion is unimportant, it must be large, i.e., relatively nonelectrophilic. Thus such gegenions may be "organic" cations such as tetrabutylammonium or hexabutylguanadinium, or may contain a metal cation which is preferably complexed to render it effectively larger. Such metal containing cations include Na, K or Cs complexed with; 18-crown-6(1,4,7,10,13,16-hexaoxacyclooctadecane), dibenzo-18-crown-6, dicyclohexyl-18-crown-6, polyethylene glycol with methoxy end groups, or tris[2-(2-methoxyethoxy)ethyl]amine. Cesium ion without any added complexing agent is a large cation. A preferred gegenion is potassium complexed with any of the above complexing agents, and 18-crown-6 and tris[2-(2-methoxyethoxy)ethyl]amine are preferred as complexing agents.

Suitable monomers, for polymerization according to the first process of the present invention, include a variety of methacrylate esters (or ester of a methacrylic acid). The ester group or radical $R^1$ of such methacrylic esters is preferably alkyl, unbranched, branched, or cycloaliphatic, which alkyl preferably contains 1 to about 20 carbon atoms. Other preferred $R^1$ groups include such alkyl groups except containing one or more ether oxygen atoms or olefinic between carbon atoms, or containing dialkylamino groups and/or oxysilyl groups. It is especially preferred if $R^1$ is methyl. Other suitable $R^1$ groups include ethyl, n-propyl, n-butyl, 2-ethylhexyl, phenyl, 2-(N,N-dimethylaminoethyl), 2-trimethylsiloxyethyl, allyl, benzyl and lauryl.

The silicon compound used herein has the formula $(R^2O)_nSiR^3_{4-n}$, wherein $R^2$, $R^3$, and n are as defined above. With the appropriate groups, these compounds are often referred to as alkoxysilanes or silyl ethers. Preferred groups for $R^2$ are alkyl, especially n-alkyl containing 1-6 carbon atoms, and more preferred, methyl. $R^2$ is selected so that the conjugate acid of $R^2O-$, which is $R^2OH$, has a $pK_a$ of about 12 to about 20, preferably about 14 to about 19. Such $pK_a$'s can be measured by various means. See, for instance, F. G. Bordwell, *Acc. Chem. Res.*, vol. 21, p. 456–463 (1988), and references cited therein.

The group $R^2$ may also be selected so that there is more than one silicon atom bound to one or more oxygen atoms in the silicon compound (this is an example of a substituted hydrocarbyl). For instance the silicon compound may be $\equiv SiOCH_2CH_2OSi\equiv$, wherein the open bonds to silicon may be to $-OR^2$ or $R^3$. Indeed, similar polymeric compounds may also be used. Useful $R^2$ groups include methyl, ethyl, and o-phenylene.

Preferred groups $R^3$ are n-alkyl containing 1 to 4 carbon atoms and phenyl. Methyl is especially preferred. Preferably, n is 1 or 4, and, more preferably, n is 1. When n is 4 (and perhaps 3), the exchange of the groups $R^2O-$ groups and $R^1O-$ groups between the methacrylate ester and silicon compound may occur. Although this may not be of concern in some situations, it may be less desirable in some polymerizations, as when forming block copolymers.

Useful silicon compounds include trimethylmethoxysilane, dimethyldimethoxylsilane, methyltrimethoxysilane, methyl orthosilicate (tetramethoxysilane), triethylmethoxysilane, trimethylethoxysilane, ethyl orthosilicate, phenyltrimethoxysilane, diphenyldimethoxysilane, n-propyl silicate, and tetrakis(2-methoxyethyl) orthosilicate. Preferred silicon compounds are methyl orthosilicate, trimethylmethoxysilane, dimethyldimethoxysilane, and ethyl orthosilicate. Trimethylmethoxysilane and dimethyldimethoxysilane are especially preferred.

The molar ratio of silicon compound to anionic initiator is 1 or more, preferably about 1 to about 100. The silicon compound may even be used as a solvent for the polymerization.

Known anionic initiators for methacrylate esters may be used for the first improved process, for instance the anions diphenylhexide, diphenylmethide, triphenylmethide, alkylsulfide anion, arylsulfide anion, alkoxides, N,N-bis(trimethylsilyl)amide, dialkylamide, alkyl isobutyrate enolates, phenylacetic acid ester enolates, malonic ester and alkyl malonic ester enolates, fluorenide, and alkylfluorenide.

Also useful as initiators for such polymerizations are combinations of: (1) sodium, potassium or cesium hydride, (2) a complexing agent for sodium, potassium or cesium cation (see below, for instance, 18-crown-6), and (3) the silicon compounds $(R^2O)_nSiR^3_{4-n}$ as described above; and the combination of (1) sodium, potassium and cesium alkoxides and (2) silicon hydrides (compounds containing a silicon-hydrogen bond). These initiator systems or combinations are novel and may be used for the known anionic polymerizations of vinyl monomers in general, preferably for the polymerization of methacrylate esters. The initiators may be prepared by simply dissolving the alkali metal hydride or alkoxide in the appropriate silicon compound, which with stirring may take a few minutes to a few hours. Typically, an excess of the silicon compound will be employed. A preferred silicon hydride is $(R^2O)_3SiH$, wherein $R^2$ is as defined above. It is is preferred if the alkali metal is potassium. Although not necessary, it is preferred if the complexing agent for the alkali metal cation is also present during the dissolution of the alkali metal hydride or alkoxide in the silicon compound. An inert solvent (as defined above) may also be optionally present.

Solvents may be present in any of these anionic polymerizations, although no solvent may be present. By a solvent is meant a liquid which may dissolve one or more of the process starting materials and/or products, or may simply act as a carrier for these materials. When appropriate, the solvent may be a silicon compound, including those described above. Suitable solvents include tetrahydrofuran, 1,2-dimethoxyethane, toluene, benzene, chlorobenzene, N,N-dimethylformamide, N,N-dimethylacetamide, dimethylsulfoxide, or mixtures thereof.

The first and second polymerization processes are carried out at $-20°$ C. to about $+100°$ C., preferably about $+20°$ C. to about $+80°$ C., more preferably about $+30°$ C. to about $+50°$ C.

The first polymerization process is believed to be one in which, despite the higher temperatures which may be employed, the polymer produced is relatively "living" (able to polymerize more monomer) until quenched. This allows the production of polymers with relatively narrow molecular weight distributions, and the prodution of block copolymers. Block copolymers may be produced in the usual manner by sequential addition of monomers or mixtures of monomers. Narrow molecular weight distributions ($M_w/M_n$), with dispersities of less than 2, preferably less than 1.5, are an indicator of living polymerizations.

In the Examples and Comparative Examples, the following abbreviations are used:

18-C-6—18-crown-6

BMA—n-butyl methacrylate

DB 18-C-6—dibenzo-18-crown-6

Et—ethyl

GPC—gel permeation chromatography

HGB—hexabutylguanadinium

Me—methyl

MMA—methyl methacrylate

Mn—number average molecular weight

Mw—weight average molecular weight

PBMA—poly(n-butyl methacrylate)
Ph—phenyl
PMMA—poly(methyl methacrylate)
TBA—tetra-n-butylammonium
THF—tetrahydrofuran

EXAMPLES 1–37 AND COMPARATIVE
EXAMPLES A–G

The following illustrative procedure was used for these Examples and Comparative Examples. Details for each are found in Table I.

Into a flask dried at 250° C. for 24 h was introduced 1.0 mmol of initiator, 2.0 mmol crown ether, 2.0–100 mmol silicon compound and 100 mL* of solvent under an inert atmosphere (oxygen and water free argon). Unless otherwise noted, the solvent is THF. To this mixture at room temperature was added in one portion* by syringe, 10 mL (93.5 mmole) MMA. Within 5 min the reaction exothermed to 40°–50° C. The solution was stirred an additional hour as the temperature dropped back to ambient. The polymerization was quenched with 10 mL methanol and the polymer precipitated with 500 mL hexane. The solid PMMA (90–100% yield) was collected on a filter and washed with hexane. After drying under reduced pressure, the molecular weight of the polymer was determined by GPC (polystyrene standard used).

*For Examples 1–20 and Comparative Examples A–C the MMA was added at a rate of 0.5 mL/min over a period of 20 min, and the amount of solvent was 30 mL.

TABLE I

| No. | Initiator (mmole) | Lewis Acid (mmole) | MMA (mmole) | PMMA (yield) | Mn (theory 10,000) | Mw/Mn | Max Temp. °C. and Comments |
|---|---|---|---|---|---|---|---|
| 1 | Methyl isobutyrate K⁺ enolate (18-C-6) (1.0) | MeOSiMe₃ (100) | 100 | 100% | 4310 | 1.20 | 41 |
| A | Methyl isobutyrate K⁺ enolate (18-C-6) (1.5) | — | 150 | 105% | 5820 | 5.50 | 33 |
| 2 | Methyl isobutyrate K⁺ enolate (18-C-6) (1.07) | MeOSiMe₃ (109) | 107 | 105% | 4650 | 1.40 | 30.9 |
| 3 | K bistrimethylsilyl amide (18-C-6) (0.125) | MeOSiMe₃ (23) | 23 | 81 | 18100 (18400 theory) | 1.46 | 25 toluene |
| B | K bistrimethylsilyl amide (18-C-6) (0.125) | — | 23 | 85 | 24500 (18400 theory) | 2.13 | 25 toluene |
| 4 | Ph₃C⁻K⁺ 18-C-6 (1.0) | (EtO)₄Si (2.0) | 94 | 84 | 12600 | 1.18 | 40 (EtO)₄Si exchanges w/monomer OEt/OMe = 1/31 |
| 5 | KH (18-C-6) (1.0) | (EtO)₄Si (2.0) | 100 | 100 | 10700 | 1.96 | 57 OEt/OMe = 1/32 |
| 6 | KH (18-C-6) (1.0) | (MeO)₄Si (2) | 100 | 93 | 8140 | 1.41 | 52 |
| 7 | KH (18-C-6) (1.0) | (MeO)₄Si (5) | 100 | 103 | 8940 | 1.62 | 58 |
| 8 | KH (18-C-6) (1.0) | (MeO)₄Si (5) | 100 | 100 | 6600 | 1.88 | 53 |
| 9 | KH (18-C-6) (1.0) | (MeO)₄Si (20 | 100 | 98 | 5180 | 1.75 | 48 15 min. induction |
| 10 | KH (18-C-6) (1.0) | (MeO)₄Si (5) | 100 | 100 | 13800 | 1.97 | 50 |
| 11 | KH (18-C-6) (1.0) | PhSi(OMe)₃ | 100 | 110 | 21200 | 2.16 | 47 |
| 12 | KH (18-C-6) (1.0) | (MeO)₄Si (20) | 100 | 100 | 11100 | 1.55 | 47 |
| 13 | KH (18-C-6) (1.0) | Ph₂Si(OMe)₂ (5.0) | 100 | 100 | 14900 | 1.40 | 47 |
| 14 | Ph₃C⁻K⁺ (1.0) | (EtO)₄Si (18-C-6)(1.0) (5.0) | 100 | 46 | 5870 | 1.44 | EtO/OMe = 2/33 |
| 15 | (EtO)₃SiH (1.0) KOtBu (18-C-6) (0.20) | (EtO)₄Si (5.0) | 100 | 82 | 19600 | 2.37 | EtO/OMe = 1/35 (theory for complete exchange 20/100) (Cat amt. of Kt-BuO) |
| 16 | (EtO)₃SiH KOtBu (18-C-6) (1.0) | (EtO)₄Si (5.0) | 100 | 114 | 9740 | 1.42 | OEt/OMe = 4.5/26 |
| 17 | Ph₃CK (1.0) (18-C-6) (2.0) | (EtO)₄Si (2) | 100 | 115 | 11100 | 1.57 | OEt/OMe = 3/30 1.2 MMA added at −60° C. rest at 24° C. |
| C | Ph₃CK (1.0) (18-C-6) (2.0) | — | 100 | | 9840 | 1.88 | |
| 18 | Ph₃CK (1.0) (18-C-6) (2.0) | (EtO)₄Si (2) | 100 | 110 | 10700 | 1.62 | 40°, OEt/OMe = 0/30 |
| 19 | Ph₃CK (1.0) (18-C-6) (2.0) | (EtO)₄Si (2.0) | 50 +50 after 1 hr. | 112 | 10400 | 1.44 | 30° 1st add. 39.4 2nd add. |
| 20 | diphenylhexyl Li Kt-BuO (1.0) | (EtO)₄Si (20) | 100 | 124 | 7820 | 1.19 | OEt/OMe = 1/2 |

TABLE I-continued

| No. | Initiator (mmole) | Lewis Acid (mmole) | MMA (mmole) | PMMA (yield) | Mn (theory 10,000) | Mw/Mn | Max Temp. °C. and Comments |
|---|---|---|---|---|---|---|---|
|  | (18-C-6) (1.0) |  |  |  |  |  |  |
| 21 | KOt-Bu (1.0) (18-C-6) (1.0) (1.0) | (EtO)$_4$Si (2.0) | 100 | 112 | 9340 | 1.57 | 45° C. OEt/OMe = 1.5/26 |
| 22 | KOtBu (18-C-6) (1.0) | (EtO)$_4$Si (5) | 47 MMA 47 BMA | 75 | 9900 | 1.41 | MMA add −60° C. aft ½ h rt BMA added at −60° C. Could be 25% homo PBMA (soluble in hexane) |
| D | KOtBu (1.0) | (EtO)$_4$Si (20) | 93.6 | 102 | 10600 | 2.19 | OEt/OMe = 7/21 |
| 23 | KH (18-C-6) (1.0) (2.0) | MeOSiMe$_3$ (93.5) | 93.5 | 97 | 4640 | 1.33 |  |
| E | KH (18-C-6) (1.0) (2.0) | — | 93.5 |  |  |  | no polymer |
| 24 | KH (18-C-6) (1.0) (2.0) | Me$_3$SiOMe (93.5) | 93.5 | 100 | 3890 | 1.46 | Toluene 44° 5 exotherm |
| 25 | KH (18-C-6) (1.0) (2.0) | (MeO)$_4$Si (93.5) | 93.5 | 98 | 9600 | 1.85 | 36.2 very low exotherm toluene |
| 26 | Kt-BuO (1.0) HBGCl (2.0) | Si(OMe)$_4$ (5.0) | 93.5 | 66 | 5300 | 1.44 | no exotherm ∴heated at 52° C. 2 hr. toluene |
| 27 | Kt-BuO (1.0) TBACl (2.0) | Si(OMe)$_4$ (5.0) | 93.5 | 78 | 9510 | 1.77 | bimodal 40° exotherm toluene |
| 28 | Kt-BuO (1.0) HBGCl (2.0) | Si(OMe)$_4$ (5.0) | 93.5 | 85 | 13.300 | 2.60 | bimodal THF |
| 29 | Kt-BuO (1.0) TBACl (2.0) | Si(OMe)$_4$ | 93.5 | 96 | 14200 | 2.25 | THF bimodal |
| 30 | NaH (1.0) 18-C-6 (2.0) | Me$_3$SiOMe (93.5) | 93.5 |  |  |  | No polymer THF |
| 31 | NaH (1.0) 18-C-6 (2.0) | Me$_3$SiOMe (93.5) | 93.5 |  |  |  | Toluene No polymer |
| 32 | KH (DB 18-C-6) (1.0) (2.0) | Me$_3$SiOMe (93.5) | 93.5 | 104 | 6150 | 1.36 |  |
| 33 | KH (8-C-6) (1.0) (2.0) | Me$_3$SiOMe 93.5 | 93.5 | 93 | 8360 | 1.42 | Stirred 1 hr. then added MMA |
| F | Kt-BuO (1.0) 18-C-6 (1.0) | — | 94 |  | 5520 | 1.99 | glyme |
| 34 | KH (2.0) 18-C-6 (2.0) | Me$_2$Si(OMe)$_2$ (93.5) | 93.5 | 99 | 5330 | 1.35 |  |
| 35 | KO-t-Bu (1.0) 18-C-6 (2.0) | Me$_3$SiOMe (93.5) | 93.5 | 102 | 9480 | 1.69 |  |
| 36 | KO-t-Bu (1.0) 18-C-6 (2.0) | Me$_3$SiOMe (93.5) | 93.5 | 103 | 7050 | 1.40 | toluene |

What is claimed is:

1. A process for the anionic polymerization of a methacrylic monomer of the formula $CH_2\!=\!C(CH_3)CO_2R^1$, wherein the improvement comprises, carrying out said anionic polymerization at a temperature of about −20° C. to about +100° C. in the presence of a silicon compound of the formula $(R^2O)_nSiR^3_{4-n}$ and a large cation which is a counterion during anionic polymerization, wherein $R^1$ is hydrocarbyl or substituted hydrocarbyl;

each $R^2$ is independently hydrocarbyl, substituted hydrocarbyl or, in combination with a second $R^2$, o-phenylene;

each $R^3$ is independently hydrocarbyl, substituted hydrocarbyl, or siloxy; and n is 1, 2, 3 or 4; provided that the $pK_a$ of the conjugate acid of $R^2O-$ is about 12 to about 20.

2. The process as recited in claim 1 wherein said $pK_a$ is about 14 to about 19.

3. The process as recited in claim 1 wherein each $R^2$ is alkyl containing 1 to 6 carbon atoms, and each $R^3$ is independently n-alkyl containing 1 to 4 carbon atoms or phenyl.

4. The process as recited in claim 1 wherein each $R^2$ and each $R^3$ is methyl.

5. The process as recited in claim 1 wherein n is 1 or 4.

6. The process as recited in claim 4 wherein n is 1.

7. The process as recited in claim 1 wherein said temperature is about +20° C. to about +80° C.

8. The process as recited in claim 1 wherein said temperature is about +30° C. to about +50° C.

9. The process as recited in claim 5 wherein said temperature is about +20° C. to about +80° C.

10. The process as recited in claim 1 wherein a block polymer is produced by the sequential addition of monomers or mixtures of monomers.

11. The process as recited in claim 1 wherein said counterion is potassium complexed with 18-crown-6, dibenzo-18-crown-6, dicyclohexyl-18-crown-6, polyethylene glycol with methoxy end groups, or tris[2-(2-methoxyethoxy)ethyl]amine.

12. A process for the anionic polymerization of a methacrylic monomer at a temperature of about −20° C. to about +100° C., wherein the improvement comprises using, as the anionic initiator, a combination of (a) a sodium, potassium or cesium hydride, (b) a complexing agent for sodium, potassium or cesium cation, and (c) a compound of the formula $(R^2O)_nSiR^3_{4-n}$, or a combination of (a) a sodium, potassium or cesium alkoxide and (b) a silicon hydride, wherein each $R^2$ is independently hydrocarbyl, substituted hydrocarbyl or, in combination with a second $R^2$, o-phenylene;

each $R^3$ is independently hydrocarbyl, substituted hydrocarbyl, or siloxy; and n is 1, 2, 3 or 4.

13. The process as recited in claim 12 wherein said alkali metal is potassium.

14. The process as recited in claim 12 wherein a methacrylate ester is polymerized.

15. The process as recited in claim 12 wherein said anionic initiator is a combination of potassium hydride, 18-crown-6 or tris[2-(2methoxyethoxy)ethyl]amine, and a compound of the formula $(R^2O)_nSiR^3_{4-n}$.

16. The process as recited in claim 12 wherein said anionic initiator is a combination of a sodium, potassium or cesium alkoxide and a silicon hydride.

17. The process as recited in claim 16 wherein said silicon hydride is $(R^2O)_3SiH$.

18. The process as recited in claim 12 wherein said combination is prepared by dissolving said sodium potassium or cesium hydride in said complexing agent and said compound, or by dissolving said sodium, potassium or cesium alkoxide in said silicon hydride.

\* \* \* \* \*